United States Patent
Carlson et al.

(10) Patent No.: US 6,620,077 B2
(45) Date of Patent: Sep. 16, 2003

(54) WORK MACHINE HAVING A DRIVE TRAIN WITH AN ENHANCED BRAKING MODE

(75) Inventors: Douglas A. Carlson, Morton, IL (US); Scott A. Leman, Eureka, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 09/945,981

(22) Filed: Sep. 4, 2001

(65) Prior Publication Data

US 2003/0045396 A1 Mar. 6, 2003

(51) Int. Cl.[7] .......................... B60K 41/04; B60K 41/02
(52) U.S. Cl. ...................... 477/107; 477/72; 477/73; 477/76; 477/98; 477/200
(58) Field of Search ................................ 477/54, 61, 62, 477/72, 73, 76, 90, 98, 107, 168, 171, 173, 185, 174, 200; 701/54, 70, 65; 192/220, 3.54, 3.28

(56) References Cited

U.S. PATENT DOCUMENTS

| | | | |
|---|---|---|---|
| 4,103,764 A | | 8/1978 | Iijima |
| 4,393,467 A | | 7/1983 | Miki et al. |
| 4,509,124 A | | 4/1985 | Suzuki et al. |
| 4,630,507 A | * | 12/1986 | Kugler et al. .............. 192/216 |
| 4,825,366 A | | 4/1989 | Yamamoto et al. |
| 5,050,717 A | * | 9/1991 | Shibayama ................ 192/3.31 |
| 5,088,582 A | * | 2/1992 | Saitou et al. .............. 192/3.31 |
| 5,161,432 A | * | 11/1992 | Matsumoto et al. ........ 477/119 |
| 5,203,235 A | | 4/1993 | Iizuka |
| 5,754,969 A | | 5/1998 | Ando et al. |
| 5,787,379 A | | 7/1998 | Ochiai et al. |
| 5,816,665 A | * | 10/1998 | Burnett et al. .............. 123/322 |
| 5,842,949 A | | 12/1998 | Kuriyama |
| 5,842,952 A | * | 12/1998 | Onimaru et al. ............. 192/215 |
| 5,857,162 A | | 1/1999 | Vukovich et al. |
| 6,231,480 B1 | * | 5/2001 | Sasaki ...................... 192/3.29 |
| 6,249,733 B1 | | 6/2001 | Smith |

* cited by examiner

*Primary Examiner*—Sherry Estremsky
*Assistant Examiner*—Tisha D. Lewis
(74) *Attorney, Agent, or Firm*—Liell & McNeil

(57) ABSTRACT

An enhanced braking mode for a work machine includes activating engine compression release brakes while placing a torque converter in an overspeed condition. By doing so, both the engine and the torque converter contribute to decelerating the work machine. This combined braking horsepower is greater than that available using the engine compression release brakes with the torque converter in a locked condition. In addition, the braking horsepower available in this enhanced braking mode is comparable to that available with the employment of hydraulic retarders, which can be substantially more expensive, and require additional hydraulic cooling system capability. The enhanced braking mode is preferably carried out automatically by the electronic control module when the vehicle is in a retarding mode.

14 Claims, 3 Drawing Sheets

WORK MACHINE HAVING A DRIVE TRAIN WITH AN ENHANCED BRAKING MODE

TECHNICAL FIELD

This invention relates generally to braking of work machines, and more particularly to a drive train having a torque converter and an enhanced braking mode.

BACKGROUND

Heavy work machines, such as wheel loaders, off-highway trucks and scrappers, etc, can have relatively high momentum, even when moving slowly. Thus, wheel brakes are almost always insufficient to produce effective braking. Thus, many work machines also employ a device commonly known as a hydraulic retarder in conjunction with wheel brakes in order to generate the braking horsepower necessary for effective slowing of these work machines. Hydraulic retarders absorb vehicle momentum by stirring a viscous liquid, such as oil, when coupled to the work machine's wheels. While hydraulic retarders can be effective, they are often a relatively expensive work machine component, and require additional cooling system capacity to reject the retarding energy.

A potential alternative to the use of hydraulic retarders is the use of engine compression release brakes. However, engine brakes often cannot produce braking horsepowers that are as high as that possible with the use of hydraulic retarders. Nevertheless, engine compression release brakes remain an attractive alternative when lower braking horsepowers are needed because they are generally substantially less expensive than hydraulic retarders and do not require additional coolers to reject the braking energy. Unfortunately, in those instances where specifications call for braking horsepowers beyond that capable with engine brakes, the only real alternative at this time is to use the relatively expensive hydraulic retarders.

Work machines of the type previously identified often include a torque converter position between the engine and the transmission. These torque converters sometimes include a lock up clutch that can be engaged to directly couple the engine output to the transmission input, or disengaged to allow the engine to be coupled to the transmission via the torque converter. It has always been the conventional wisdom to engage the lock up clutch when in a retarding mode in order to transfer as much wheel rotational energy from the work machine wheels to the engine, which is believed to be the dominant factor in a retarding mode that relies upon engine brakes. In other words, it has long been the conventional wisdom to engage the lock up clutch so that as much energy as possible can be absorbed by the engine via compression release brakes, which would be inherently less effective if the lock up clutch were disengaged.

Engineers have found that manipulation of the control of the lock up clutch can change the performance of one or more work machine components. One example of manipulation of a lock up clutch control to allegedly improve an aspect of performance is illustrated in U.S. Pat. No. 4,509,124, which issued to Suzuki et al. on Apr. 2, 1985. In this example, the lock up clutch is temporarily disengaged during gear shifting to reduce a shift shock which could be felt by the work machine operator. In addition to this use of the lock up clutch, engineers are always searching for other methods of improving work machine performance, especially when in a retarding mode.

The present invention is directed to overcoming one or more of the problems as set forth above, and to improving braking capabilities.

SUMMARY OF THE INVENTION

In one aspect, a method of enhanced braking comprises an initial step of coupling an engine to at least one wheel of a work machine at least in part via a torque converter. The torque converter is placed in an overspeed condition while activating an engine compression release brake system.

In another aspect, a drive train retarding system for a work machine includes an internal combustion engine having a selectively operable compression release braking system. A torque converter is operably coupled to the engine and has a locked condition and an unlocked condition. A braking enhancer is operable to place the torque converter in an unlocked condition when the compression release braking system is activated.

In still another aspect, a work machine includes at least one wheel and an engine with a compression release braking system attached to a chassis. A torque converter is attached to the chassis and positioned to operably couple the engine to the work machine wheel(s). A braking enhancer is operable to place the torque converter in an unlocked condition when the compression release braking system is activated.

DETAILED DESCRIPTION

Figure 1:
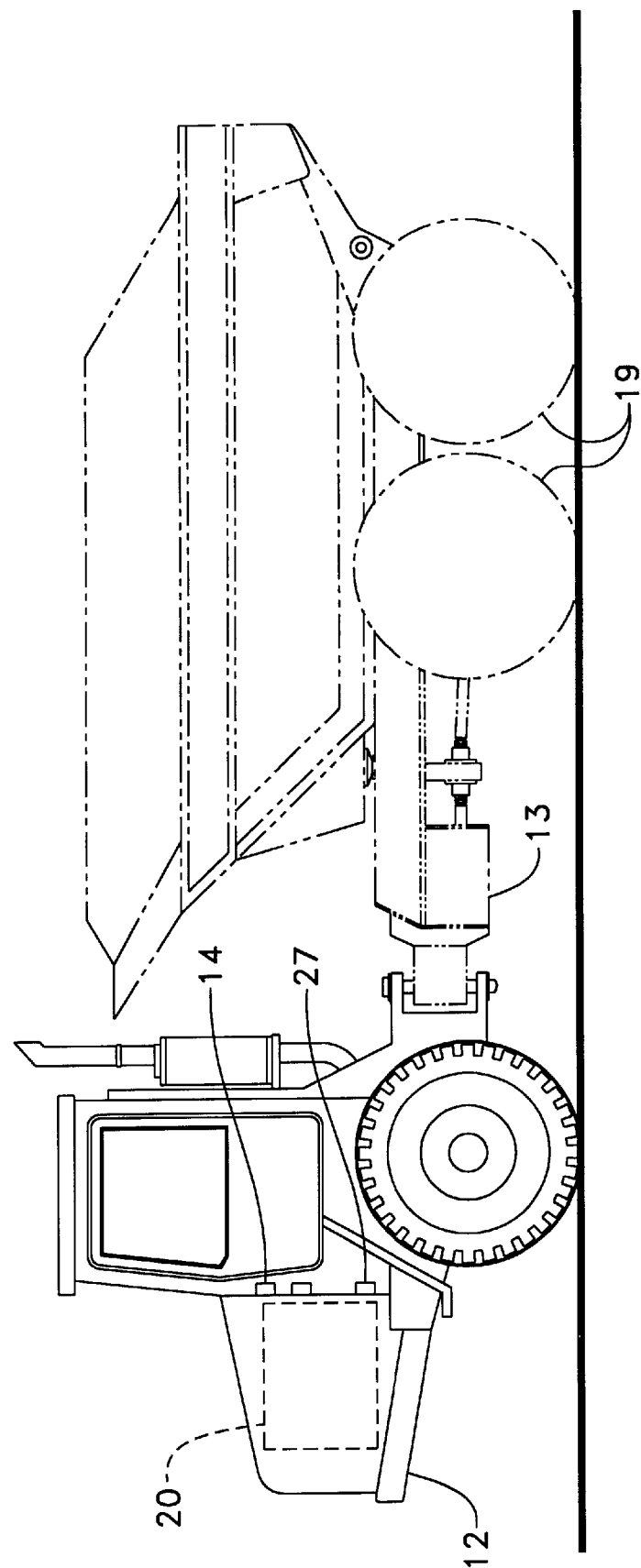
FIG. 1 is a diagrammatic representation of a articulated truck work machine according to the present invention.

Referring to FIG. 1, work machine 10, which in this example embodiment is an articulated truck, includes a chassis 12 which includes a variety of components attached thereto in a known manner. Among these components are an engine 20 operably coupled to wheels 19 via a drive train 13. Many of these components have features that are automatically controlled via an electronic control module 27 in a known manner. In the case of the present invention, an engine compression release brake activator 14 is preferably positioned in the operator compartment, so that the operator can activate the engine compression release brakes and place the work machine 10 in a retarding mode. In addition, a torque converter temperature indicator is preferably also located in the operator compartment so that the operating temperature of the torque converter portion of the drive train can be monitored. Alternatively, the temperature of the torque converter might be, and likely would be, monitored automatically by the electronic control module 27 in a conventional manner.

Figure 2:
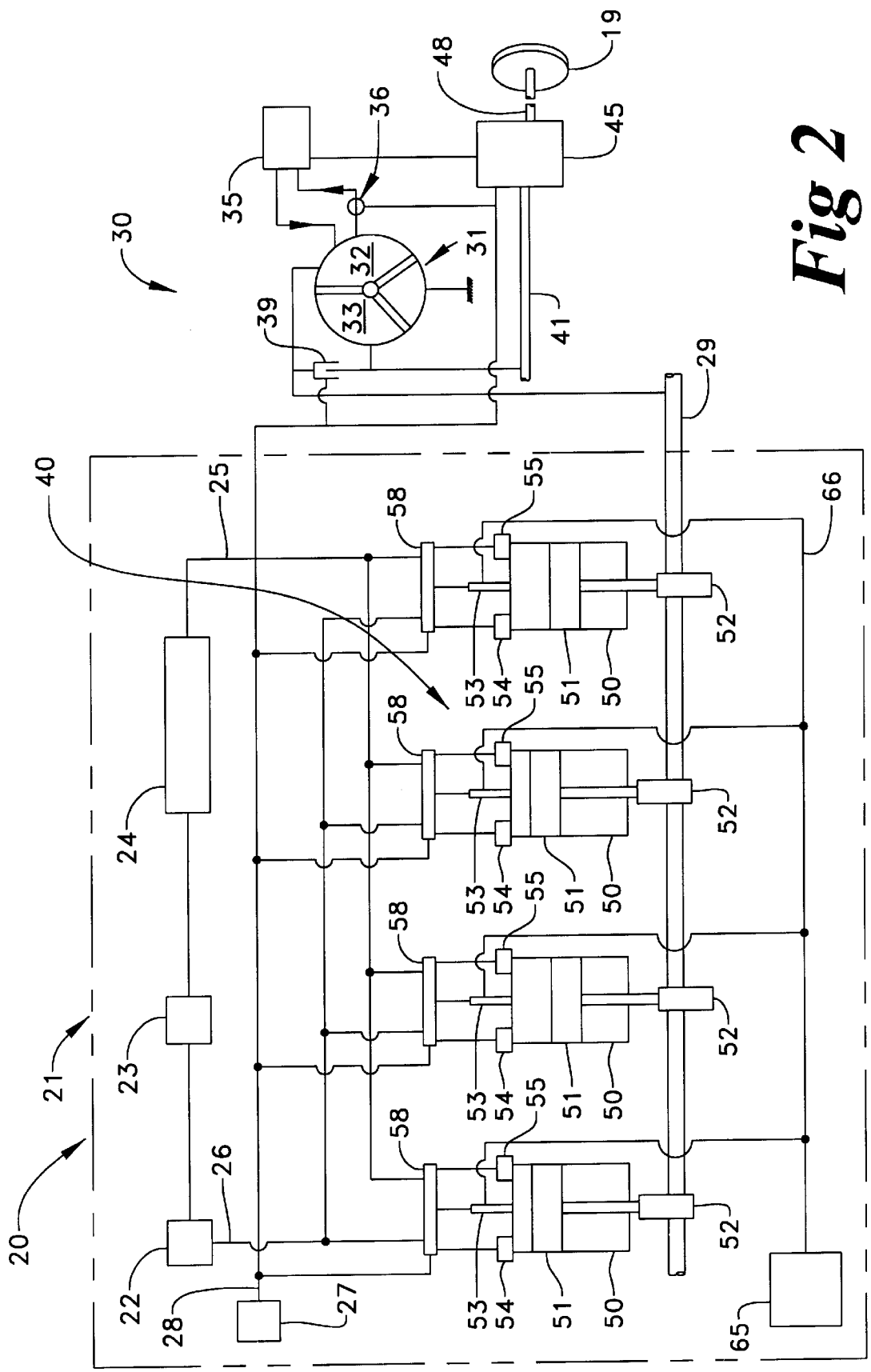
FIG. 2 is a schematic representation of an engine and drive train according to the present invention.

Referring in addition to FIG. 2, engine 20 is illustrated according to the preferred embodiment of the present invention. Engine 20 preferably includes a drive train retarding system 30 that provides a torque converter 31 that is operably positioned between engine 20 and a transmission 45. Torque converter 31 may or may not include a free wheeling stator; however, it should have the ability to be placed in either a locked condition or an unlocked condition in order to fall within the contemplated scope of the present invention. Preferably, transmission 45 is an automatic transmission of a type well known in the art and is controlled at least in part by electronic control module 27. A manual transmission would also be compatible with the present invention. Torque converter 31 includes an input member operably coupled to the engine crank shaft 29, a pump 32, an output member operably coupled to the input shaft 41 of transmission 45, a turbine 33 and a lock up clutch 39. A source of hydraulic fluid 35, which contains an amount of a suitable fluid such as engine lubricating oil or transmission fluid, is fluidly connected to both pump 32 and transmission 45. Torque converter 31 is utilized in a conventional manner to convert hydraulic pressure into mechanical torque which can drive the wheels 19 to propel work machine 10. Torque converter 31 is positioned such that engine crank shaft 29 drives pump 32, which in turn can drive turbine 33 via the fluid connection. Turbine 33 is connected to transmission input shaft 41, and is capable of driving the same. The transmission output shaft 48, the movement of which is controlled by a rotation of transmission input shaft 41 can then drive work machine wheels 19.

When lock up clutch 39 is engaged, the engine crank shaft 29 is directly coupled to transmission input shaft 41 so that both rotate at the same rate. When lock up clutch is disengaged, engine crank shaft 29 is operably coupled to transmission input shaft 41 via torque converter 31 so that the two shafts can rotate at different rates according to the desired torque to be transmitted to the wheels in a known manner. For instance, those skilled in the art will appreciate that when work machine 10 is in operation, it is sometimes desirable to engage the lock up clutch at certain speeds during certain modes of operation. In other instances, it is desirable to disengage a lock up clutch over a different range of speeds and desired operations.

Returning to engine 20, a low pressure reservoir 22 is provided in engine 20 and preferably includes an amount of low pressure engine lubricating oil. While low pressure reservoir 22 is preferably an oil pan that has an amount of engine lubricating oil, it should be appreciated that other fluid sources having an amount of available fluid, such as coolant, transmission fluid or fuel, could instead be used. A high pressure pump 23 pumps oil from low pressure reservoir 22 and delivers the same to a high pressure manifold 24. High pressure oil flowing out of high pressure manifold 24 is delivered via high pressure fluid supply line 25 to a hydraulic system provided in engine 20. The oil is returned to low pressure reservoir 22 via low pressure return line 26 after it has performed work in the hydraulic system. Engine 20 also has an engine housing 21 that defines a plurality of cylinders 50. As illustrated in FIG. 2, each cylinder 50 preferably includes an electronically controlled fuel injector 53 that is fluidly connected to a fuel source 65 via a fuel supply line 66. In addition, each cylinder 50 could also include one or more gas exchange valves. As illustrated, these valves preferably include an electronically controlled intake valve 54 and a electronically controlled engine compression release brake valve 55 that are attached to engine housing 21. Although the compression release brake valve 55 and fuel injectors 53 have been illustrated as preferably being hydraulically actuated, those skilled in the art will appreciate that any suitable activation methodology, which may or may not include mechanical devices such as rotating cams, could be substituted without departing from the intended scope of the present invention. In addition, these devices need not necessarily be electrically controllable in order to function with the present invention.

Electronically controlled engine compression release brake valves 55 are preferably components in an compression release braking system 40 provided by drive train retarding system 30. While engine 20 has been illustrated as having an engine brake valve 55 that is provided for each engine cylinder 50, it should be appreciated that engine brake valves on less that the total number of cylinders could be included.

Also provided as part of engine 20 is an electronic control module 27 that is control communication with various components of engine 20 including lock up clutch 38, transmission 45, fuel injectors 53 and engine brake valves 55 via communication line 28 and one or more actuators 58. Electronic control module 27 is any traditional electronic control module that controls work machine components in a known manner in response to various input signals, such as engine speed, engine temperature and various other sensor inputs. However, electronic control module 27 preferably has been programmed to include an additional code that will allow work machine 10 to operate in an enhanced braking mode according to the present invention. Thus, the various hardware components that make up work machine 10, could remain unchanged with the implementation of the present invention. This existing hardware along with the software features carried by electronic control module 27 can be thought of as being a braking enhancer according to the present invention. In some instances, such as a work machine with a manual transmission, the operator is arguably a portion of the braking enhancer according to the invention.

Each of the engine cylinders 50 defined by engine housing 21 has a moveable piston 51. Each piston 51 is connected to engine crank shaft 29 via a connection rod 52 in a convention manner. Each piston is moveable between a top dead center and a bottom dead center position in order to drive rotation of engine crank shaft 29 in a conventional manner.

A brake enhancer according to the present invention generally includes the ability to place the torque converter in an overspeed condition while also activating the engine compression release brakes. Those skilled in the art will appreciate that the torque converter can generally be placed in an overspeed condition by having the work machine descend a downhill grade, by downshifting the transmission when the lock up clutch is disengaged by ceasing engine fuel during any vehicle travel while in gear, or by any combination of these. Although it is conceivable that the brake enhancer of the present invention could be performed manually by an operator down shifting the transmission while disengaging the torque converter lock up clutch, these operations are preferably performed automatically by the electronic control module according to stored maps that are a function of at least one of the torque converter input speed and the torque converter output speed, as well as other important variables such as torque converter temperature. Those skilled in the art will appreciate that by utilizing predetermined maps, an enhanced braking procedure can be optimized. For instance, in many cases one overall braking event could require two or more transmission downshifts at particular speeds in order to achieve the maximum possible braking according to the present invention. In other instances, such as when descending a hill, no downshifts are needed to activate the brake enhancer of the present invention.

Industrial Applicabilty

The enhanced braking mode according to the present invention takes place when a work machine is in a retarding mode. In most cases, the electronic control module will detect a retarding mode by some operator action, such as by activating the engine compression release brakes and/or depressing a brake pedal. Those skilled in the art will appreciate that depending upon what the work machine is doing prior to entering a retarding mode, the torque converter may or may not already be in an unlocked condition. If the lock up clutch is engaged, the electronic control module or the operator will disengage the lock up clutch in order to place the torque converter in an unlocked condition. Next, the torque converter is placed in an overspeed condition by any of several ways. It can go into overspeed due to the work machine descending a downhill grade and/or by having engine fuel removed during any vehicle travel while in gear, and/or by performing a downshift so that the torque converter output is rotating at a substantially higher rate than the torque converter input. Those skilled in the art will appreciate that during powered modes, torque is inputted to the torque converter via the input shaft. When in a braking mode, torque is inputted to the torque converter via its output shaft. Also during this operation, the engine compression release brakes begin operating to produce a retarding torque on the engine which is transmitted to the vehicle wheels via the torque converter, which is now in an overspeed condition. The combined braking horsepower produced by the torque converter and engine brakes is greater than that possible with the engine brakes alone. The braking horsepower is approximately equally divided between the engine and the converter if a free-wheeling stator is used in the converter.

Similar to hydraulic retarders, the torque converter temperature will inevitably rise when placed in an overspeed condition, but at a slower rate due to the reduced power absorbtion. Thus, in another aspect of the present invention, the temperature of the torque converter is monitored either by the operator via an indicator and/or by the electronic control module. In order to prevent damage to the torque converter, the lock up clutch is preferably engaged or reengaged whenever the torque converter temperature exceeds a predetermined temperature. This can be accomplished automatically by an electronic control module command or conceivably be accomplished manually by alerting the operator to place the torque converter back into a locked condition because the torque converter is in danger of overheating. Thus, in the event that it is not already included, there is preferably some means such as a temperature sensor 36 (FIG. 2) for monitoring the torque converter temperature so that the lock up clutch 38 can be reengaged before the torque converter reaches a critical temperature. Thus, when in operation, the enhanced braking mode may not always be available if the torque converter temperature is above a pre-determined temperature. In these cases, braking of the work machine would be accomplished by the wheel brakes and the engine compression release brakes alone. Preferably, some means such as an indicator would be included to alert the machine operator as to whether the enhanced braking mode is available so that the operator can take into account the amount of braking horsepower that is available at any given time.

Figure 3:
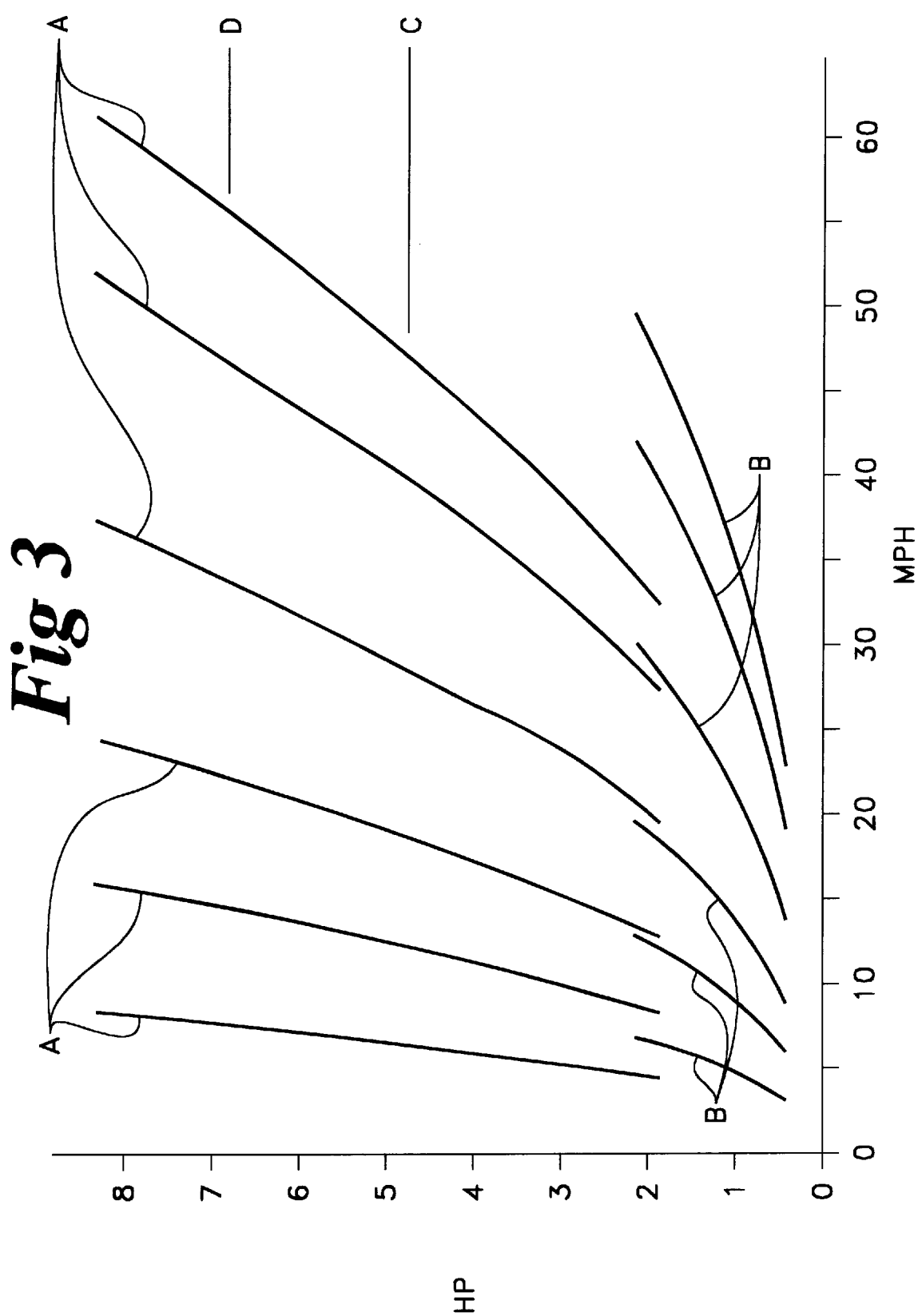
FIG. 3 is a graph of braking horsepower verses work machine speed for comparing braking horsepower capabilities of the present invention to other braking strategies.

Referring now to FIG. 3, the curves (A) show the braking horsepowers available at a variety of work machine speeds when utilizing a brake enhancer or enhance braking mode according to the present invention. The curves identified with the letter (B) show the amount of vehicle braking available without engine compression release brakes, or the amount of retarding available due to rotational drag in the drive train and engine without engine braking. The horizontal line marked with the letter (C) shows the maximum amount of braking horsepower available to a comparable vehicle utilizing the engine compression release brakes with the torque converter in a locked condition. The horizontal line marked with the letter D shows about the maximum amount of braking horsepower available in a comparable work machine that employs a hydraulic retarder. Thus, FIG. 3 shows that the enhanced braking mode of the present invention presents a viable alternative to the employment of a hydraulic retarder. In addition, the present invention would likely have substantially lower costs than a counterpart hydraulic retarder braking system since engine compression release brakes generally cost a fraction of that associated with a hydraulic retarder, and the hydraulic cooling requirements are less.

Those skilled in the art will appreciate that in many instances, the present invention can be implemented with little or no changes in hardware. For instance, in a work machine already equipped with engine compression release brakes and a torque converter having the ability to go into an unlocked condition, the present invention could be implemented with modest software changes to the electronic control module along with storage of appropriate maps that would direct the enhanced braking mode during the dynamic braking process. In other instances, a work machine could be altered by substituting the electronic control module software changes and engine compression release braking system for a hydraulic retarder that may have been included in a previous design. This could be done in a way that would likely improve braking capabilities while also reducing costs.

It should be understood that the above description is intended for illustrative purposes only, and is not intended to limit the scope of the present invention in any way. Thus, those skilled in the art will appreciate that other aspects, objects and advantages of this invention can be obtained from a study of the drawings, the disclosure and the appended claims.

What is claimed is:

1. A method of enhanced braking, comprising the steps of:
   coupling an engine to at least one wheel of a work machine at least in part via a torque converter;
   activating at least one engine compression release brake; and
   placing said torque converter in an overspeed condition during at least a portion of said activating step when said at least engine compression release brake is engaged.

2. The method of claim 1 wherein said placing step includes a step of disengaging a lock-up clutch.

3. The method of claim 1 including a step of monitoring an operating temperature of said torque converter.

4. The method of claim 3 wherein said monitoring step includes a step of determining a temperature of hydraulic fluid in said torque converter.

5. The method of claim 4 including a step of locking said torque converter if said operating temperature exceeds a predetermined temperature.

6. The method of claim 1 wherein said placing step includes at least one step of downshifting a transmission, descending a downhill grade while in gear, and ceasing engine fueling while in gear and moving.

7. A drive train retarding system for a work machine, comprising:
   an internal combustion engine having a selectively operable compression release braking system;
   a torque converter operably coupled to said engine, and having a locked condition and an unlocked condition; and a braking enhancer operable to place said torque converter in said unlocked condition when said compression release braking system is activated and at least one engine compression release brake is engaged.

8. The drive train retarding system of claim 7 wherein said torque converter includes a lock-up clutch that is engaged when said torque converter is in said locked condition, and said lock-up clutch is disengaged when said torque converter is in said unlocked condition.

9. The drive train retarding system of claim 7 wherein said brake enhancer is operable to place said torque converter in a locked condition when said torque converter is above a predetermined temperature.

10. The drive train retarding system of claim 7 wherein said brake enhancer includes an electronic control module having access to brake enhancing maps that include transmission positions as a function of at least one of a torque converter input speed and a torque converter output speed.

11. A work machine comprising:

a chassis;

at least one wheel attached to said chassis;

an engine attached to said chassis and including a compression release brake system;

a torque converter attached to said chassis and being positioned to operably couple said engine to said at least one wheel; and a braking enhancer operable to place said torque converter in an unlocked condition when said compression release braking system is activated and at least one engine compression release brake is engaged.

12. The work machine of claim 11 wherein said torque converter includes a lock-up clutch that is disengaged when said torque converter is in said unlocked condition, and said lock-up clutch being disengaged when said torque converter is in a locked condition.

13. The work machine of claim 11 wherein said braking enhancer includes said torque converter being in an overspeed condition.

14. The work machine of claim 11 wherein said brake enhancer includes an electronic control module having access to brake enhancing maps that include transmission positions as a function of at least one of a torque converter input speed and a torque converter output speed.

* * * * *